United States Patent
Miyazaki (10) Patent No.: US 9,195,024 B2
(45) Date of Patent: Nov. 24, 2015

(54) DRIVE DEVICE, LENS BARREL, AND IMAGING APPARATUS

(71) Applicant: CANON KABUSHIKI KAISHA, Tokyo (JP)

(72) Inventor: Takashi Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 13/911,270

(22) Filed: Jun. 6, 2013

(65) Prior Publication Data

US 2014/0002913 A1 Jan. 2, 2014

(30) Foreign Application Priority Data

Jun. 27, 2012 (JP) .................................. 2012-143744

(51) Int. Cl.
*G02B 7/02* (2006.01)
*H02K 11/00* (2006.01)
*H02K 7/06* (2006.01)

(52) U.S. Cl.
CPC *G02B 7/023* (2013.01); *H02K 7/06* (2013.01); *H02K 11/0026* (2013.01)

(58) Field of Classification Search
CPC ........ G02B 7/023; H02K 11/0026; H02K 7/06
See application file for complete search history.

(56) References Cited

U.S. PATENT DOCUMENTS

| 1,355,854 | A | * | 10/1920 | Schurr et al. ..................... 409/77 |
| 3,193,744 | A | * | 7/1965 | Seward .......................... 318/592 |
| 5,602,681 | A | * | 2/1997 | Nakayama et al. ........... 359/698 |
| 6,282,380 | B1 | * | 8/2001 | Yamamoto ....................... 396/97 |
| 7,815,966 | B2 | | 10/2010 | Miyazaki et al. |
| 7,901,732 | B2 | | 3/2011 | Yashima et al. |
| 2003/0161626 | A1 | | 8/2003 | Namazue et al. |

FOREIGN PATENT DOCUMENTS

JP 2000-193877 A 7/2000

* cited by examiner

*Primary Examiner* — Jordan Schwartz
*Assistant Examiner* — Georgeo G King
(74) *Attorney, Agent, or Firm* — Fitzpatrick, Cella, Harper & Scinto (57) ABSTRACT

A lens barrel including a focus motor, a screw that is provided on an axis of the focus motor and that is rotatably driven by the focus motor, a pulse plate that rotates integrally with the screw, and a holding unit that is provided adjacent to the focus motor. The pulse plate is attached to an outer periphery of the holding unit and an outer diameter of the holding unit is greater than that of the screw.

18 Claims, 10 Drawing Sheets

DRIVE DEVICE, LENS BARREL, AND IMAGING APPARATUS

BACKGROUND OF THE INVENTION

1. Field of the Invention

The present invention relates to a drive device, a lens barrel, and an imaging apparatus.

2. Description of the Related Art

In imaging apparatuses such as digital cameras, video cameras, and the like, there has been proposed the following position control in order to accurately drive an optical element such as a lens. In other words, an imaging apparatus rotates a pulse plate such as a screw, a propeller, or the like by mainly using a stepping motor or the like and detects a count of the pulse plate using a detecting unit such as a photo interrupter to thereby perform position control.

Japanese Patent Laid-Open No. 2000-193877 discloses a camera that includes a screw portion extending from a drive unit in the optical axis direction and a shaft portion extending coaxial with the axis of the screw portion and rotatably supports the screw portion by receiving both ends of the screw portion with a bearing. When the screw portion rotates by the driving of the drive unit, a driven unit screwed to the screw portion travels along the straight line together with a feed female screw. A pulse plate such as a propeller is attached to the distal end of the shaft portion. With this arrangement, the camera detects the movement of the pulse plate using a detecting unit such as a photo interrupter and performs position control of the driven unit with high accuracy by controlling the rotation of the screw portion.

Figure 12:
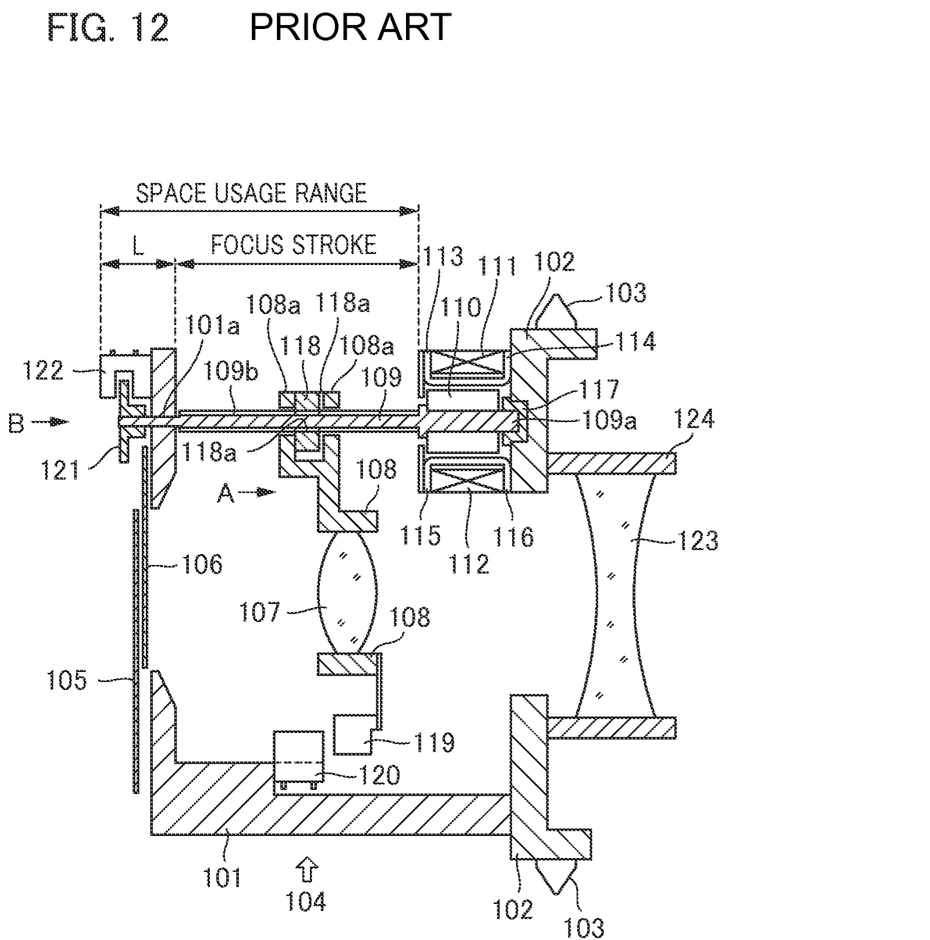
FIG. 12 is a diagram illustrating an example of a configuration of a lens barrel provided in the camera disclosed in Japanese Patent Laid-Open No. 2000-193877.

FIG. 12 is a diagram illustrating an example of a configuration of a lens barrel provided in the camera disclosed in Japanese Patent Laid-Open No. 2000-193877 and a drive device within the lens barrel. In the camera disclosed in Japanese Patent Laid-Open No. 2000-193877, a pulse plate 121 that controls the rotation of a screw is attached to the distal end of a shaft portion so as to be retrofittable in consideration of easiness of assembly. However, in the configuration, a flexible substrate that connects photo interrupters for detecting the movement of the pulse plate 121 is extended because the pulse plate 121 is attached to the distal end of the shaft portion, resulting in an increase in costs. In addition, since the pulse plate 121 is attached to the distal end of the shaft portion in the camera, other components must be structured so as to avoid the pulse plate 121, resulting in a reduction in the degree of freedom in design. Furthermore, since the distance between the drive unit and the pulse plate 121 is long in the camera, the vibration of the pulse plate increases, resulting in an adverse effect on controllability.

SUMMARY OF THE INVENTION

The present invention provides a drive device that is capable of reducing the length of a flexible substrate, increasing the degree of freedom in design, and achieving an improvement in controllability.

According to an aspect of the present invention, a drive device is provided that includes a drive unit; a lead screw that is provided on an axis of the drive unit and is rotatably driven by the drive unit; a pulse plate that rotates integrally with the lead screw; and a holding unit that is provided adjacent to the drive unit, wherein the pulse plate is attached to the outer periphery of the holding unit and the outer diameter of the holding unit is greater than that of the lead screw.

According to the present invention, a drive device that is capable of reducing the length of a flexible substrate, increasing the degree of freedom in design, and achieving an improvement in controllability may be provided.

Further features of the present invention will become apparent from the following description of exemplary embodiments with reference to the attached drawings.

DESCRIPTION OF THE EMBODIMENTS

First Embodiment

Figure 1:
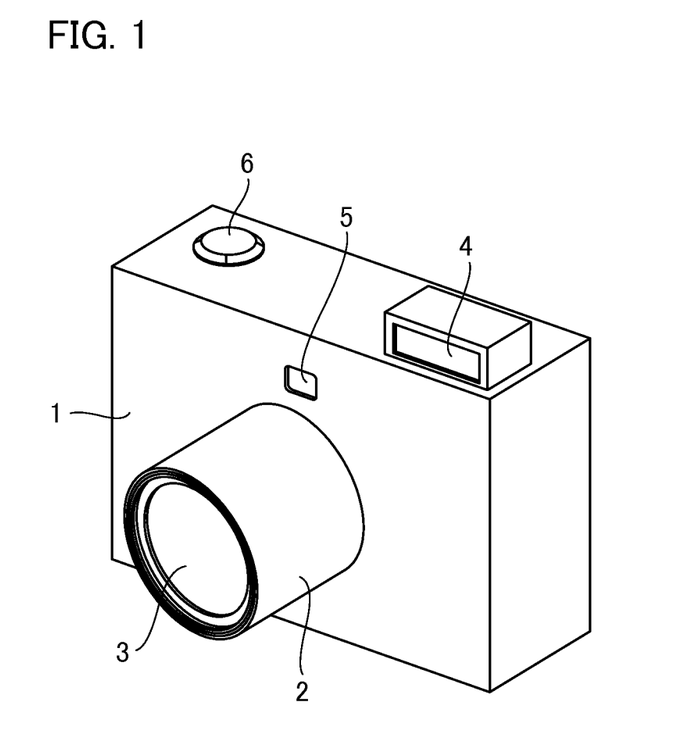
FIG. 1 is a view illustrating an example of an external appearance of an imaging apparatus according to the present embodiment.

FIG. 1 is a view illustrating an example of an external appearance of an imaging apparatus according to the present embodiment. A camera main body 1 has a lens barrel 2 which can change a focal distance of a photographing lens on the front surface thereof. A lens cap for protecting a lens 3 is attachable to the front surface of the lens barrel 2. Also, the camera main body 1 has a light-emitting window unit 4 that constitutes a strobe device for irradiating an object with illumination light on the top surface thereof. A finder window 5 is provided on the front surface of the camera main body 1.

A release button 6 that starts the photography preparing operation (focus adjusting operation and light measuring operation) and the photographing operation (exposure to an imaging element such as a film, a sensor, or the like) is provided on the top surface of the camera main body 1. Note that the imaging apparatus of the present invention is not limited to the configuration shown in FIG. 1.

Figure 2:
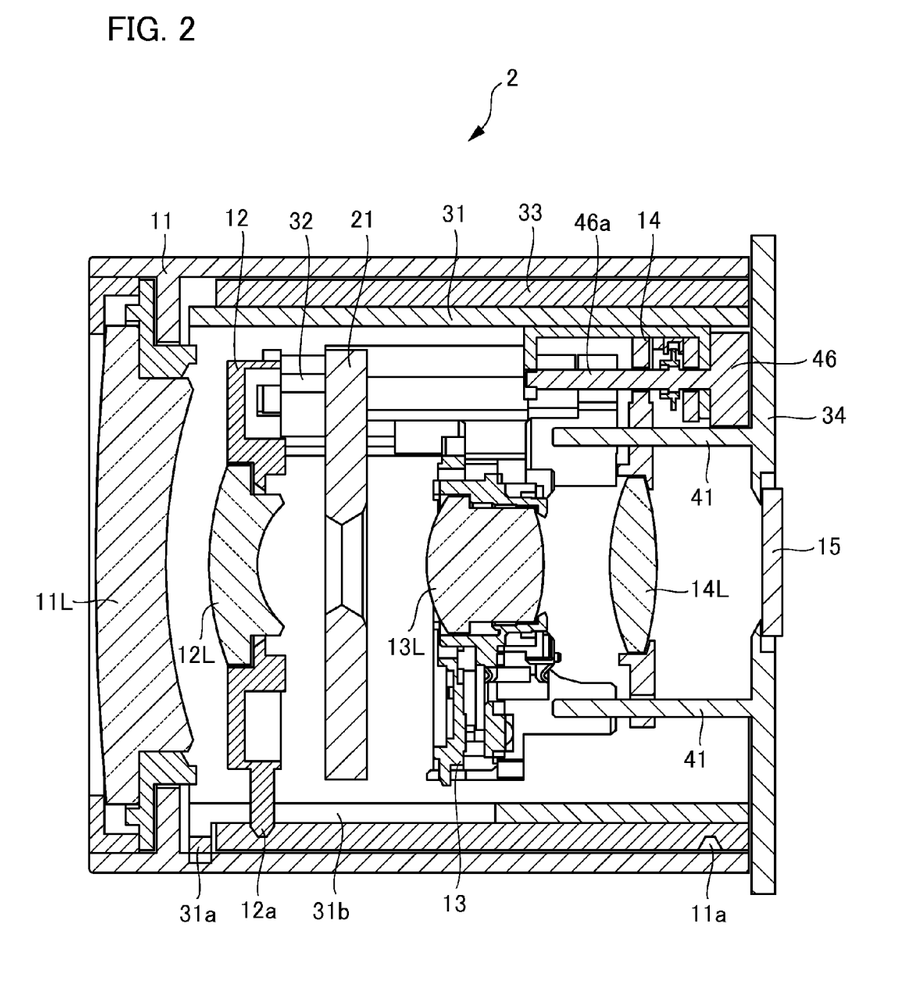
FIG. 2 is a cross-sectional view illustrating an exemplary barrel of an imaging apparatus.
Figure 3:
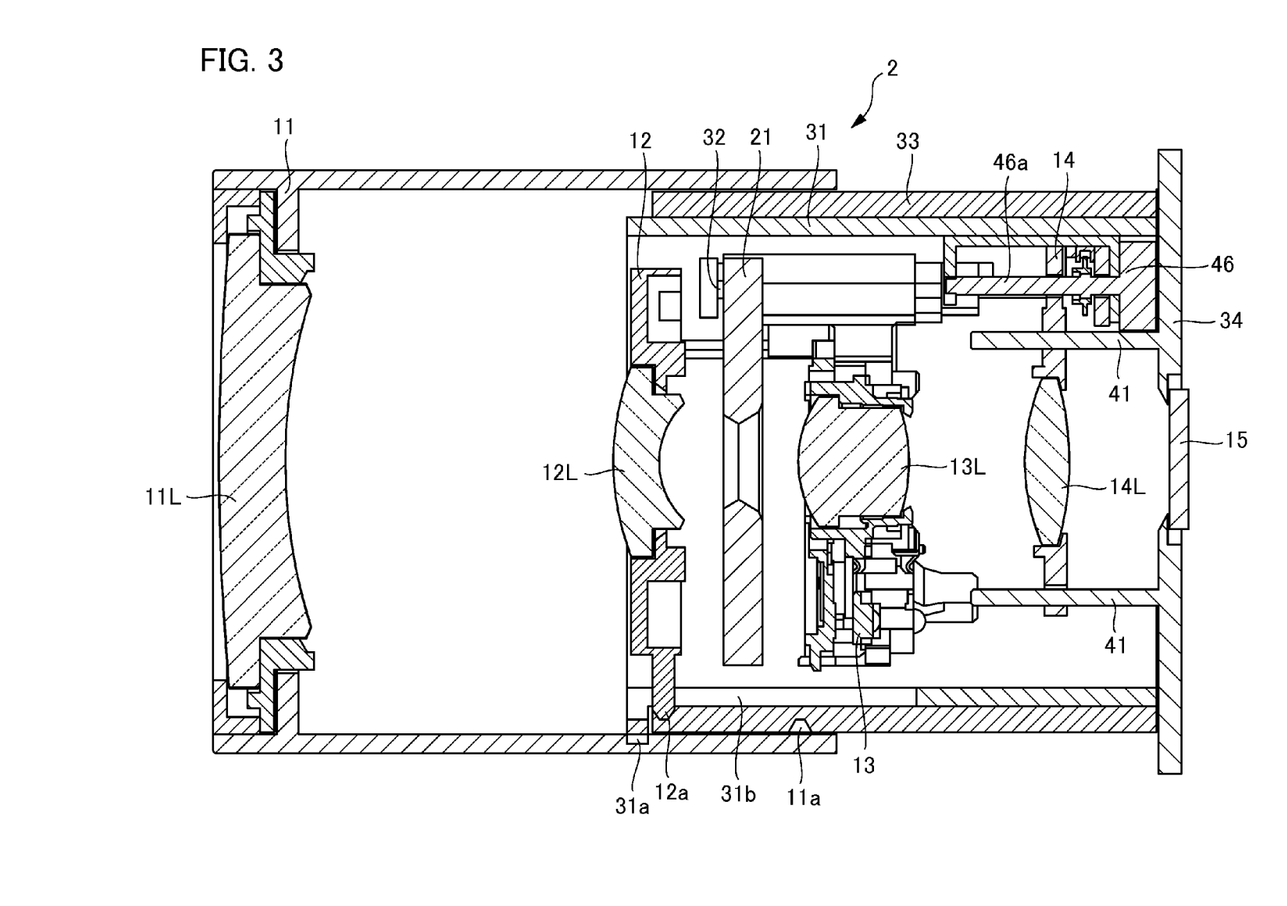
FIG. 3 is a cross-sectional view illustrating an exemplary barrel of an imaging apparatus.

FIG. 2 and FIG. 3 are cross-sectional views illustrating an exemplary barrel of an imaging apparatus. FIG. 2 is a cross-sectional view illustrating an exemplary barrel of an imaging apparatus when the lens barrel 2 (shown in FIG. 1) is in a retracted state. FIG. 3 is a cross-sectional view illustrating an exemplary barrel of an imaging apparatus in an imaging state.

Figure 4:
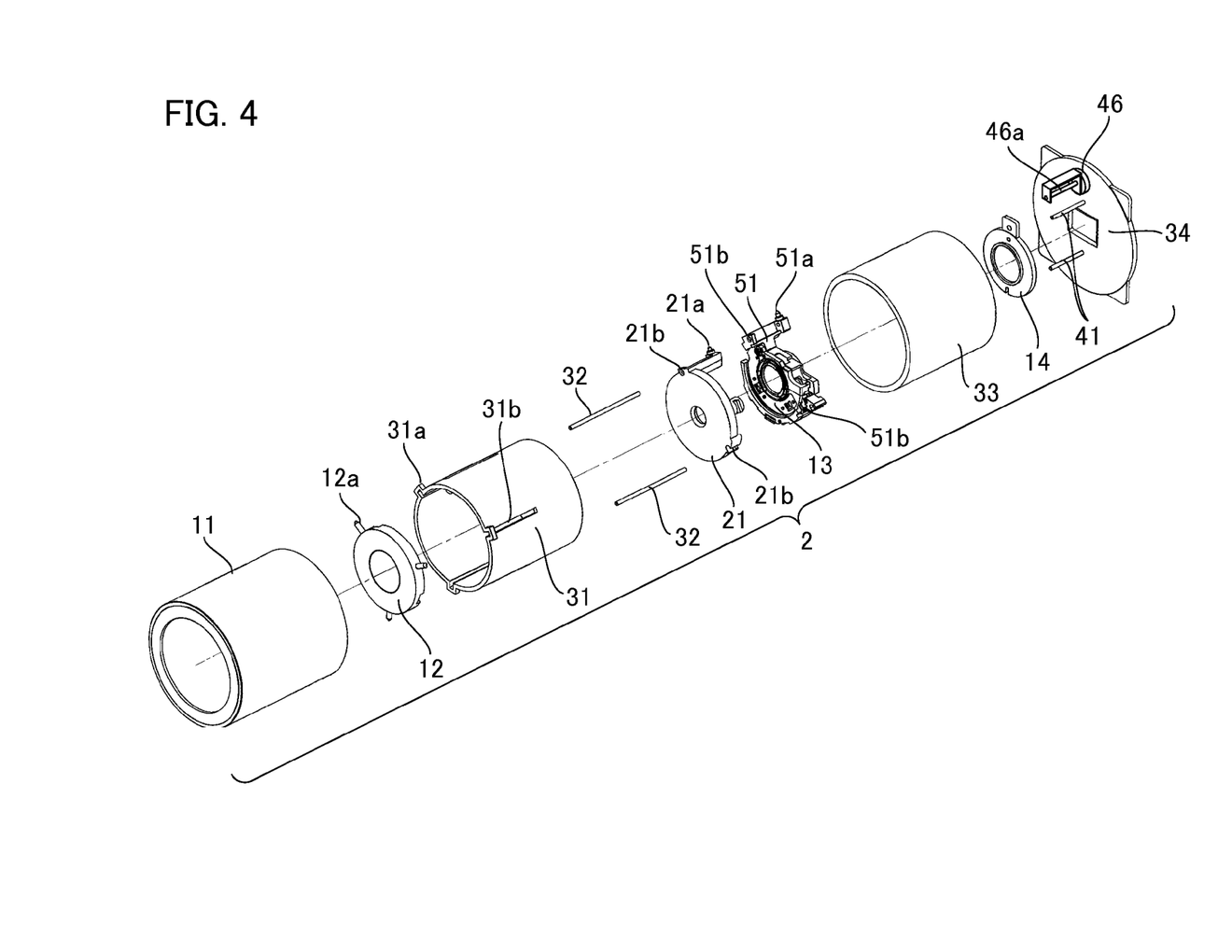
FIG. 4 is an exploded perspective view illustrating an exemplary barrel of an imaging apparatus.

FIG. 4 is an exploded perspective view illustrating an exemplary barrel of an imaging apparatus.

As shown in FIGS. 1 to 4, an imaging optical system provided in the lens barrel of the present embodiment includes a photographing lens group of four groups. A first group lens 11L is held in a first group barrel 11, a second group lens 12L is held in a second group holder 12, and a third group lens 13L is held in a third group unit 13. A fourth group lens 14L which is a focus group is held in a fourth group holder 14. The lens barrel 2 has a mechanism that holds the photographing lens group of four groups described above and is capable of advancing and retracting the photographing lens group in the optical axis direction. Also, the lens barrel 2 functions as a camera by being installed on a camera main body 1.

Next, a description will be given of the internal configuration of the lens barrel 2 and the operation performed thereby. A fixed barrel 31 includes a guide portion 31a that linearly guides the first group barrel 11 in the optical axis direction and a guide groove 31b that linearly guides the second group holder 12 in the optical axis direction. A linear motion groove (not shown) that is provided on the radially inside of the first group barrel 11 engages with the guide portion 31a of the fixed barrel 31. In the second group holder 12, a cam pin 12a engages with the guide groove 31b of the fixed barrel 31. With this arrangement, the second group holder 12 is linearly guided in the optical axis direction.

The fixed barrel 31 holds two guide bars 32 which are provided on the inside diameter side thereof, respectively. The guide bar 32 engages with a guide portion 21b (shown in FIG. 4) of an aperture shutter unit 21 that controls the amount of light. Also, the guide bar 32 engages with an engaging portion 51b (shown in FIG. 4) that is provided in a third group base 51 in the third group unit 13. With the aid of the rotation restriction of these two guide bars 32, the aperture shutter unit 21 and the third group unit 13 are linearly guided in the optical axis direction.

A cam groove (not shown) is provided on the radially outside of a cam tube 33 and engages with a cam pin 11a of the first group barrel 11. Also, a cam groove (not shown) is provided on the radially inside of the cam tube 33 and engages with the cam pin 12a of the second group holder 12, the cam pin 21a (shown in FIG. 4) of the aperture shutter unit 21, and the cam pin 51a (shown in FIG. 4) of the third group base 51 in the third group unit 13, respectively. The amount of movement of these groups in the optical axis direction is controlled by the amount of lift of these cam grooves.

With the aid of a power source (not shown), the cam tube 33 rotates about the optical axis around the outer periphery of the fixed barrel 31 and each group moves along the cam grooves in the optical axis direction. With this arrangement, the lens barrel 2 changes the entire length of the barrel in an imaging state and in a retracted state so that each group can be moved in the optical axis direction.

A sensor holder 34 holds an imaging element 15 and a focus motor 46. With the aid of the power of the focus motor 46 that functions as a drive unit, the fourth group holder 14 moves in the optical axis direction while being guided by a guide shaft 41. The fixed barrel 31 and the sensor holder 34 are fixed by screws or the like. Also, the unitized lens barrel 2 is fixed by screws or the like via the sensor holder 34 and is held in the camera main body 1.

Figure 5:
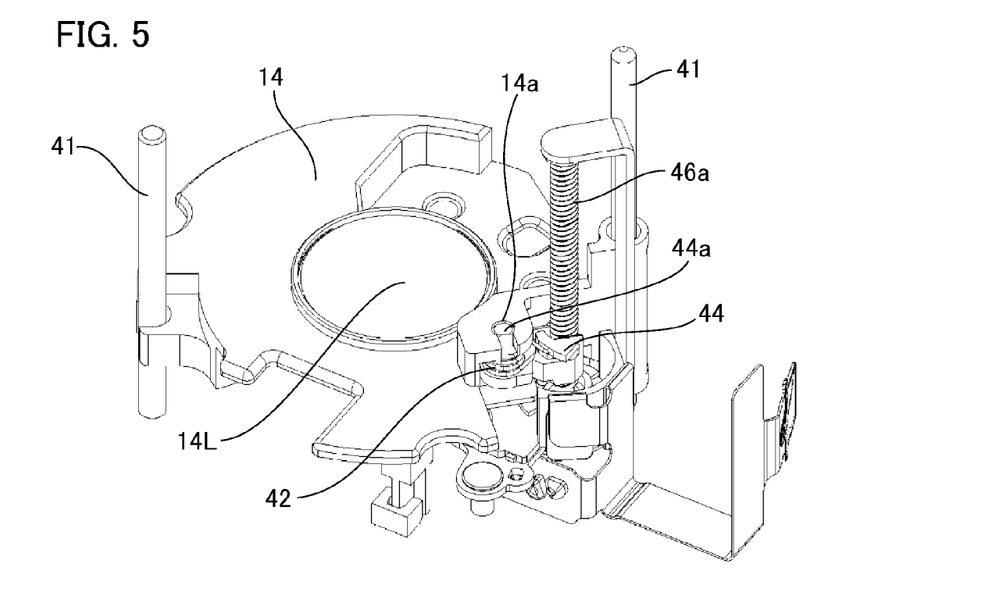
FIG. 5 is a perspective view illustrating an exemplary fourth group holder.
Figure 6:
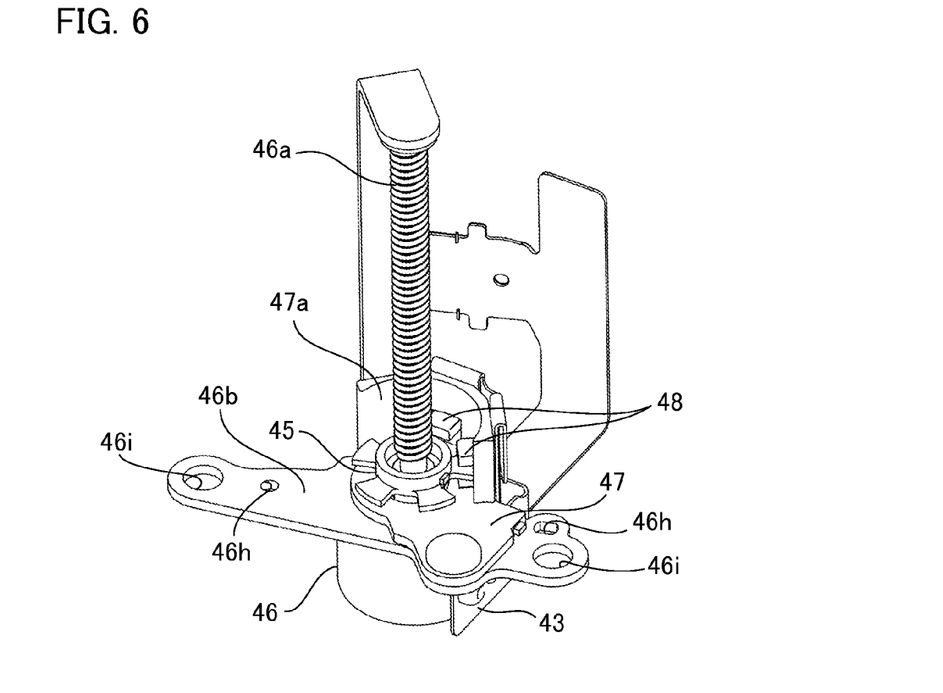
FIG. 6 is a perspective view illustrating an exemplary fourth group holder.
Figure 7A:
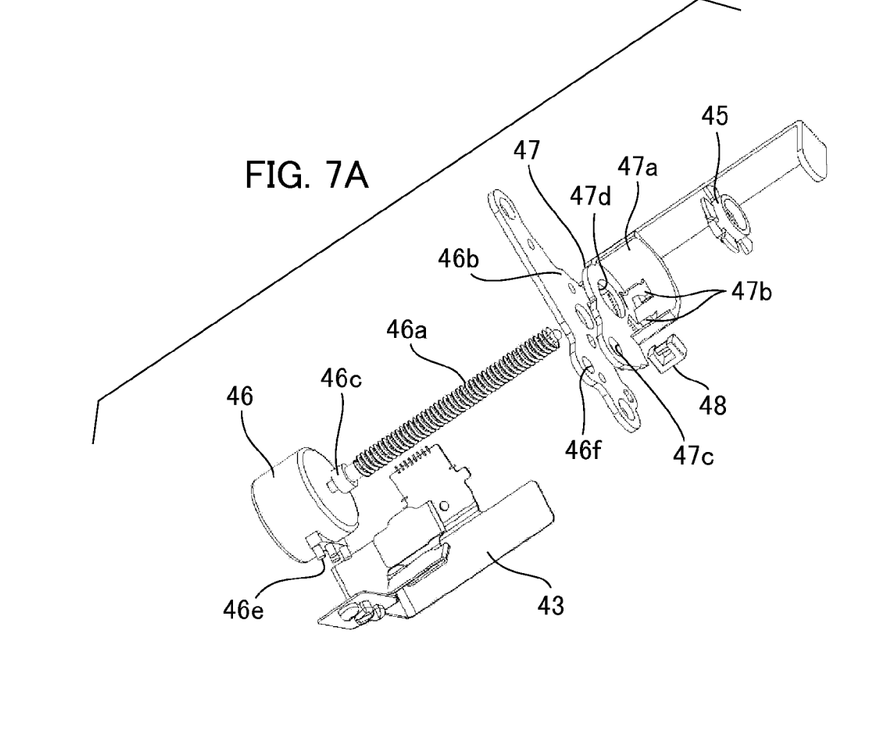
FIGS. 7A and 7B are perspective views illustrating an exemplary fourth group holder.
Figure 7B:
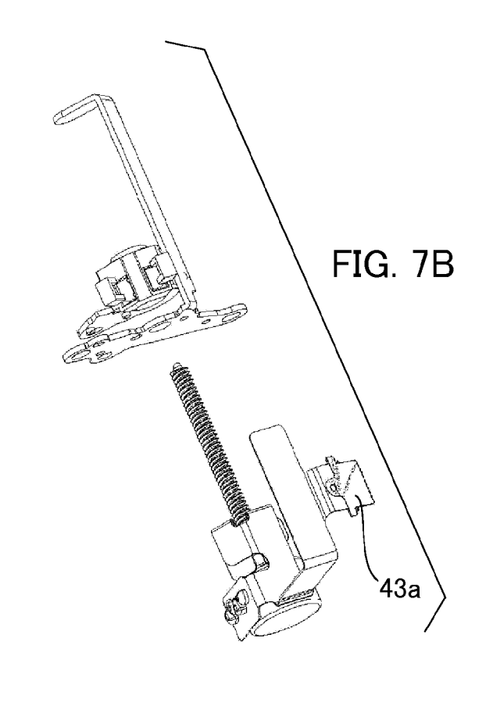

Next, a description will be given of a mechanism on the periphery of the fourth group (focus group) with reference to FIGS. 5 to 10. FIGS. 5 to 7 are perspective views illustrating an exemplary fourth group holder. In the fourth group holder 14, a rack shaft portion 44a is fitted to a fourth group holder shaft hole 14a using a rack 44 and a compression spring 42 so that the compression spring 42 is pressed against the rack shaft portion 44a to thereby eliminate rattling in the optical axis direction.

The rack 44 meshes with a lead screw 46a that extends from the focus motor 46 in the optical axis direction, and the lead screw 46a and the rack 44 are urged by the compression spring 42 that also functions as a torsion spring. The fourth group holder 14 follows the rack 44, which advances and retracts by the excitement of the focus motor 46, on the lead screw 46a side to thereby advance and retract along a guide bar 41 in the optical axis direction.

As shown in FIGS. 7A and 7B, the lead screw 46a is provided on the axis of the focus motor 46 and is rotatably driven by the focus motor 46. A holding unit 46c is provided adjacent to the focus motor 46 at the root (imaging surface side) of the lead screw 46a. The lead screw 46a and the pulse plate 45 are integrally rotatable by attaching a pulse plate 45 which is configured to be fit in the holding unit 46c. A signal of the pulse plate 45 is detected by two photo interrupters 48 held by a photo interrupter holder 47 and the direction of the rotation is detected by the phase difference between light and dark.

The photo interrupters 48 are inserted into, aligned to, and fixed to two hole portions 47b that are formed in a vertical wall portion 47a of the photo interrupter holder 47 which is molded by a mold, respectively. The photo interrupter 48 is surface-mounted on a flexible substrate 43, and signal lines of the photo interrupters 48 are combined with signal lines from a terminal part 46e of the focus motor 46 by the flexible substrate 43 and thereby are electrically connected from a connector part 43a to the external. At this time, the peripheral four directions of the photo interrupters 48 are covered by walls of a mold member such that the photo interrupters 48 are not brought into contact with the metal component of the focus motor 46. As shown in FIG. 6, these are unitized as a component.

The photo interrupter holder 47 is arranged closer to the object side than a U-shaped sheet metal flange portion 46b, and is fixed with respect to a screw hole 46f of the U-shaped sheet metal flange portion 46b by screwing through a hole portion 47c of the photo interrupter holder (shown in FIGS. 7A and 7B). The U-shaped sheet metal is fixed to the focus motor 46 by welding or the like and is configured in such a manner as to receive the distal end of the lead screw 46a on the object side. The focus motor 46 is positioned with respect to the sensor holder 34 through two positioning holes 46h and is fastened through a screw hole 46i (shown in FIG. 6).

The holding unit 46c is provided coaxially with the lead screw 46a and between the drive unit-side terminal section (focus motor-side terminal section) of the lead screw 46a and the focus motor 46. Then, the pulse plate 45 is attached to the outer periphery of the holding unit 46c.

Figure 8:
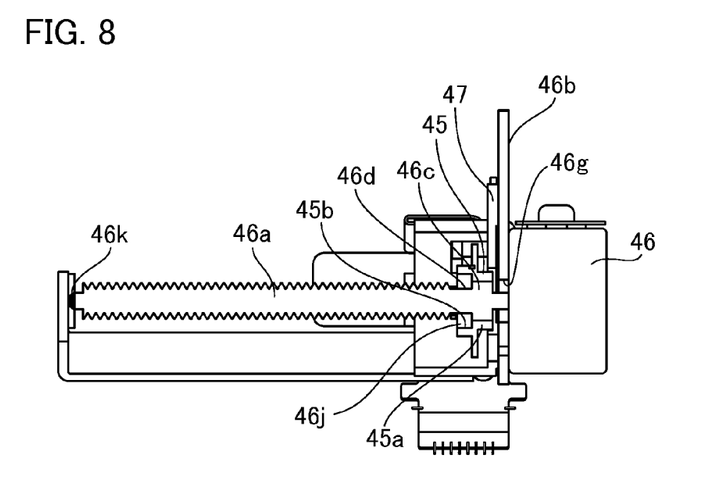
FIG. 8 is a diagram illustrating the positional relationship between a focus motor and its peripheral components which are provided in a lens barrel according to a first embodiment.
Figure 9:
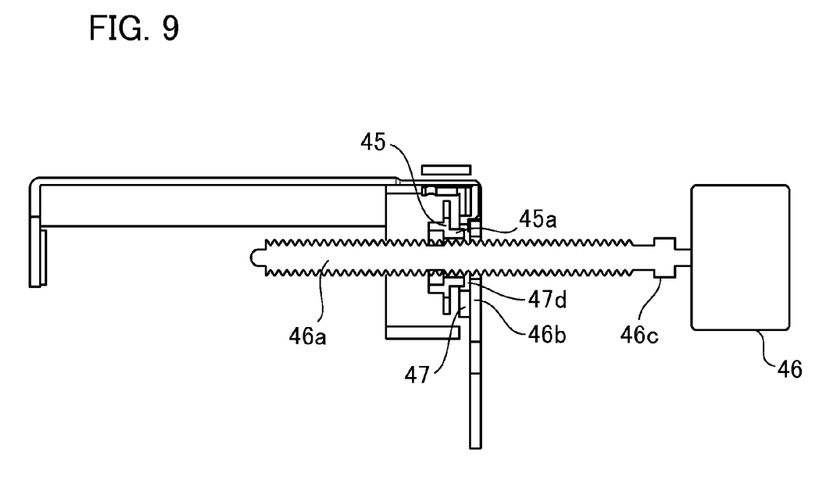
FIG. 9 is a diagram illustrating the positional relationship between a focus motor and its peripheral components which are provided in a lens barrel according to a second embodiment.
Figure 10:
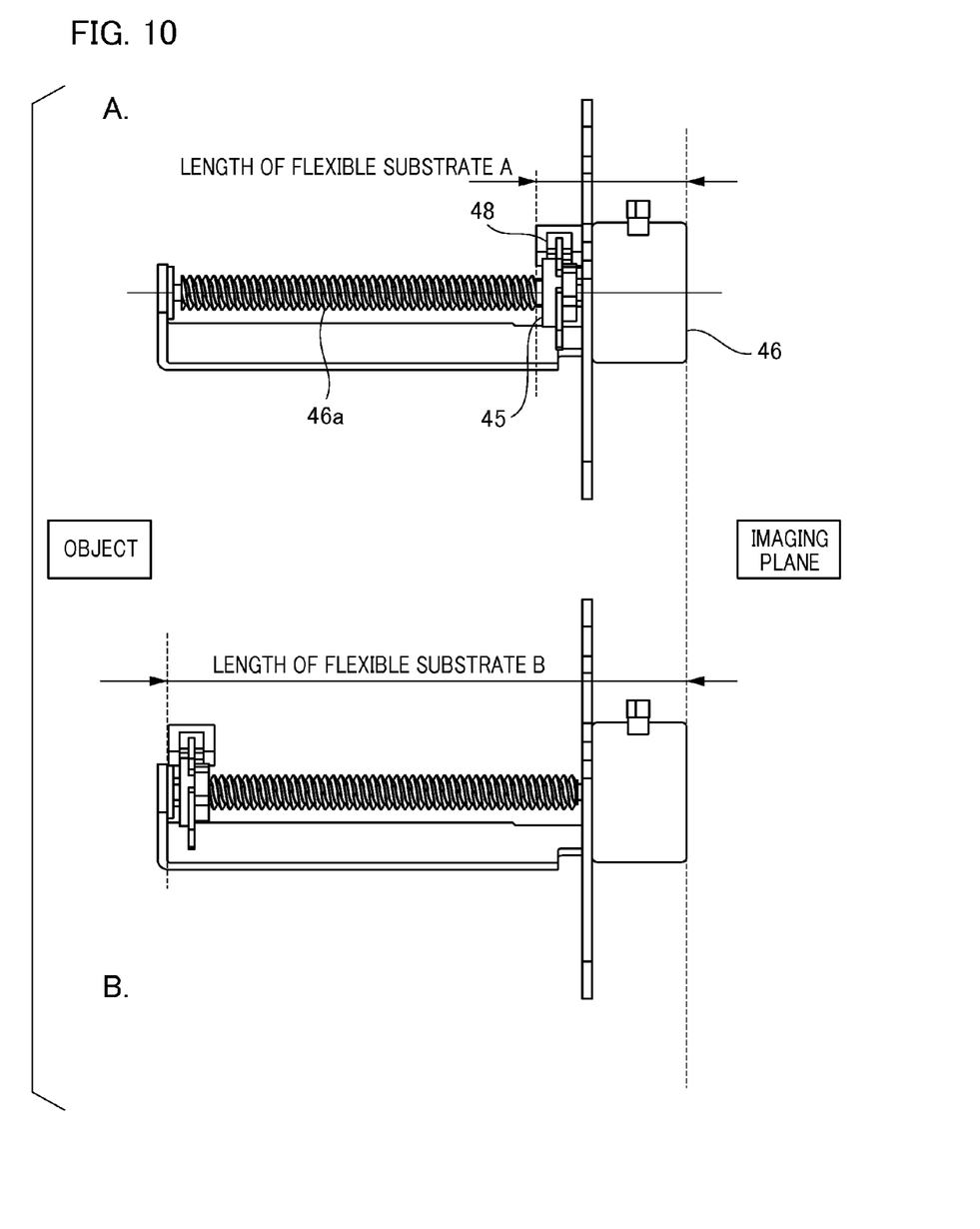
FIGS. 10A and 10B are diagrams illustrating the effect of the first embodiment.

FIGS. 8 and 9 are diagrams illustrating the positional relationship between a focus motor and its peripheral components which are provided in the lens barrel according to the first embodiment. In the lens barrel of the first embodiment, the lead screw 46a is formed integrally with the holding unit 46c in a rolling process. As the order of processing and assembling, firstly, a shaft portion extending from the focus motor 46 in the optical axis direction is formed on the lead screw 46a by rolling process. At this time, since no component is attached around the focus motor 46, a rolling process can be readily executed, resulting in high-precision processing.

Next, the U-shaped sheet metal flange portion 46b is inserted into the focus motor 46 from the object side of the lead screw 46a that extends from the focus motor 46 in the optical axis direction. At this time, the outer diameter of a U-shaped sheet metal shaft hole portion 46g is greater than the outer diameter of the lead screw 46a and the diameter of the holding unit 46c so as to be retrofittable. It should be noted that if the lead screw 46a is received by a U-shaped sheet metal lead screw receiving portion 46k at this time, the pulse plate 45 cannot be assembled with the photo interrupter holder 47. Thus, the photo interrupter holder 47 and the pulse plate 45 are sequentially inserted from the object side of the lead screw 46a in the optical axis direction before the lead screw 46a is received by the U-shaped sheet metal lead screw receiving portion 46k.

FIG. 9 is a diagram illustrating insertion of a lead screw. In FIG. 9, the U-shaped sheet metal, the photo interrupter holder 47, and the pulse plate 45 are assembled in air with respect to the focus motor 46 but can be easily assembled by being handled with a jig. At this time, a photo interrupter holder shaft hole portion 47d is greater than the lead screw 46a and the holding unit 46c so as to be retrofittable. Also, the inner diameter of a pulse plate holding hole 45a and the outer diameter of the holding unit 46c are greater than the outer diameter of the lead screw 46a. Thus, the pulse plate 45 is retrofittable from the object side of the lead screw 46a.

The pulse plate 45 is attached to the holding unit 46c that is arranged at the root (imaging surface side in the optical axis direction) of the lead screw 46a. At this time, as described above, since the U-shaped sheet metal 46a, the photo interrupter holder 47, and the pulse plate 45 are retrofittable after assembling the focus motor 46 alone, the same assemblability can be ensured as that in the case where the pulse plate is placed at the distal end side (the object side in the optical axis direction) of the lead screw 46a. With this arrangement, the photo interrupter 48 is brought closer to the focus motor 46, the length of the flexible substrate 43 can be shortened by the distance by which the photo interrupter 48 is brought closer to the focus motor 46.

In other words, the outer diameter of the holding unit 46c and the inner diameter of the pulse plate holding hole 45a are greater than the outer diameter of the lead screw 46a. After the pulse plate 45 and a flange portion 46c are set, the focus motor 46 with the lead screw 46a attached thereto can be inserted from the imaging element side of the pulse plate 45 and the U-shaped sheet metal flange portion 46b. With this arrangement, the pulse plate 45 can be arranged at the root of the lead screw 46a, resulting in a reduction in length of the flexible substrate.

FIGS. 10A and 10B are diagrams illustrating the effect of the first embodiment. FIG. 10A is a diagram illustrating the positional relationship between a focus motor and its peripheral components which are provided in the lens barrel of the present embodiment. FIG. 10B is a diagram illustrating the positional relationship between a focus motor and its peripheral components which are provided in the lens barrel of a conventional lens barrel. In the conventional lens barrel, the pulse plate is attached to the distal end of the lead screw. Thus, as shown in FIG. 10B, the length of the flexible substrate is B. On the other hand, in the lens barrel of the present embodiment, the pulse plate 45 is attached to the root of the lead screw. Thus, as shown in FIG. 10A, the length of the flexible substrate is A, and is shorter than the length B of the flexible substrate shown in FIG. 10B.

In the lens barrel of the present embodiment, the pulse plate 45 is attached to the root of the lead screw 46a, and thus, the vibration of the pulse plate 45 can be reduced as compared with the case where the pulse plate 45 is attached to the distal end of the lead screw 46a. In particular, an excellent effect of suppressing vibration of the pulse plate can be expected if the configuration is made such that the lead screw 46a is not received by the U-shaped sheet metal.

When the lead screw 46a is formed integrally with the holding unit 46c in a rolling process, a straight section 46d is formed between the lead screw 46a and the holding unit 46c. The straight section 46d is an extension portion that extends along the axis of the lead screw 46a. At this time, as shown in FIG. 8, a wall portion 45b that extends from the pulse plate 45 along the axis of the lead screw 46a is erected and a gap portion 46j is provided between the straight section 46d and the wall portion 45b that extends from the pulse plate 45 in the optical axis direction. With this arrangement, blowing of liquid lubricant applied to the lead screw 46a is prevented by the wall portion 45b that extends from the pulse plate 45 in the optical axis direction and the gap portion 46j surrounded by the pulse plate 45 and the straight section 46d may serve as a lubricant reservoir.

Second Embodiment

Figure 11:
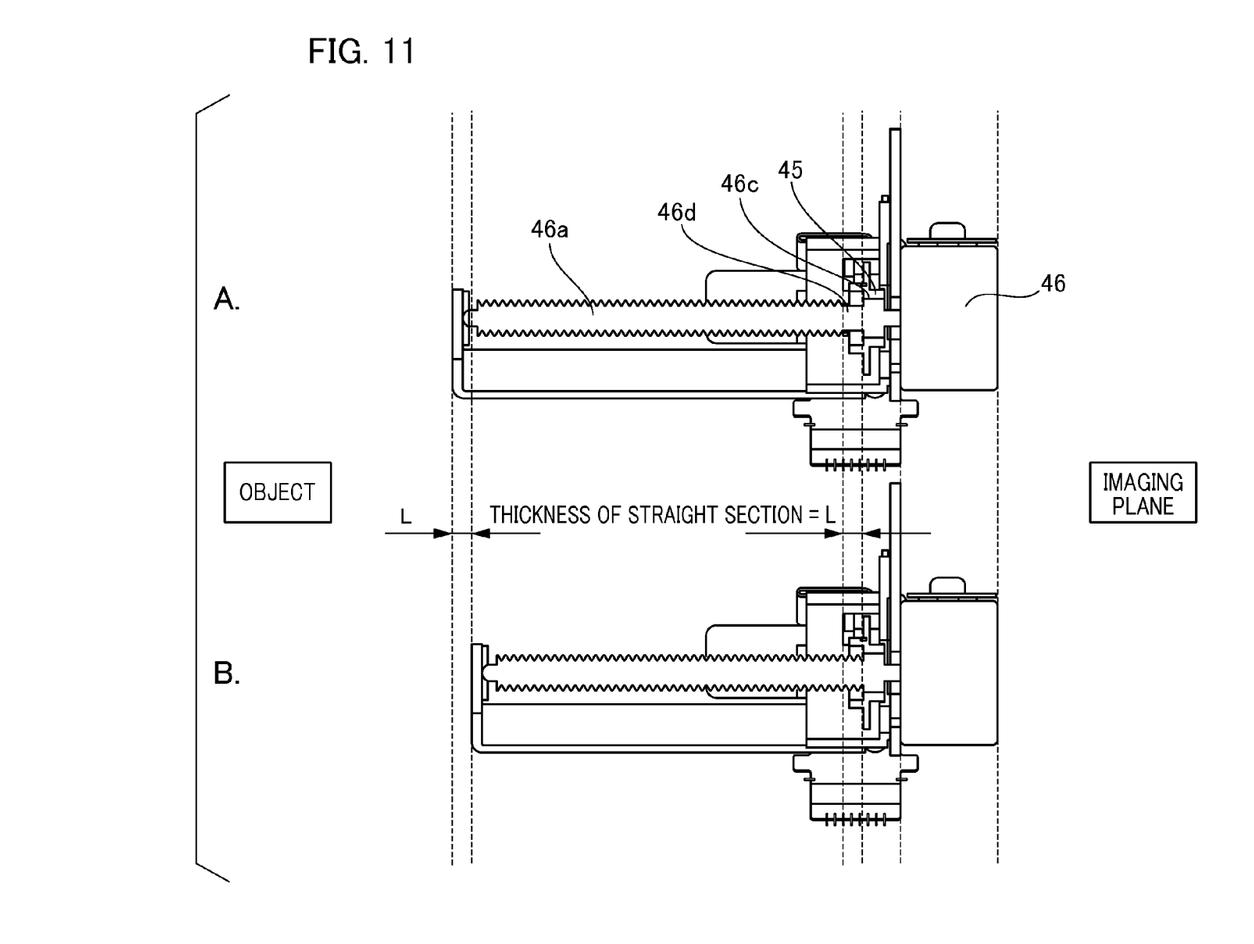
FIGS. 11A and 11B are diagrams illustrating a difference between the configuration of the first embodiment and that of the second embodiment.

In the second embodiment, the lead screw 46a and the holding unit 46c are formed by separate members. FIGS. 11A and 11B are diagrams illustrating the difference between the configuration of the first embodiment and the configuration of the second embodiment. FIG. 11A is a diagram illustrating an exemplary configuration on the periphery of a lead screw provided in the lens barrel according to the first embodiment. FIG. 11B is a diagram illustrating an exemplary configuration on the periphery of a lead screw provided in the lens barrel according to the second embodiment.

In the lens barrel shown in FIG. 11A, the lead screw 46a and the holding unit 46c are adjacent to each other with the straight section 46d therebetween. On the other hand, in the lens barrel of the second embodiment, the lead screw 46a is brought into intimate contact with the holding unit 46c as shown in FIG. 11B. In other words, in the second embodiment, the lead screw 46a is a separate member from the holding unit 46c and the holding unit 46c is attached to the lead screw 46a. Thus, in contrast to the configuration in which the lead screw 46a is made integral with the holding unit 46c, there is no need to sandwich the straight section 46d. With this arrangement, the lead screw 46a can be brought into intimate contact with the holding unit 46c. Consequently, a focus stroke can be shifted toward the image plane by the length L as shown in FIGS. 11A and 11B.

While, in the first and second embodiments described above, the pulse plate 45 is held by being press-fit into the holding unit 46c, the pulse plate 45 is held by being tapped into the pulse plate holding hole 45a without the holding unit 46c so that the pulse plate may be arranged at a predetermined position so as to be fixed by rotation.

While the embodiments of the present invention have been described with reference to exemplary embodiments, it is to be understood that the invention is not limited to the disclosed exemplary embodiments but includes various modifications without departing from the spirit of the present invention.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-143744 filed on Jun. 27, 2012 which is hereby incorporated by reference herein in its entirety.

What is claimed is:

1. A drive device comprising:
   a drive unit comprising a lead screw;
   a rotation member which is fixed on the lead screw; and
   a detector that detects a rotation of the rotation member,
   wherein the lead screw is projected from a body portion of the drive unit,
   wherein the lead screw comprises a screw portion and a fixed portion on which the rotation member is fixed,
   wherein the rotation member is fixed on an outer periphery of the fixed portion,
   wherein the fixed portion is provided between the screw portion and the body portion of the drive unit,
   wherein the rotation member comprises (a) a detected portion that is detected by the detector and (b) a wall portion that extends from the detected portion along an axis of the lead screw and that surrounds a part of the lead screw.

2. The drive device according to claim 1, wherein the lead screw comprises a straight portion which is provided between the screw portion and the fixed portion, and
   wherein the wall portion surrounds the straight portion.

3. The drive device according to claim 1, the wall portion surrounds at least a part of the screw.

4. The drive device according to claim 1, further comprising:
   a flange member which is fixed to the drive unit;
   wherein the flange member has a hole portion, and
   wherein an outer diameter of the hole portion is greater than that of the fixed portion.

5. The device according to claim 1, further comprising:
   a holder which holds the detector,
   wherein the holder has a hole portion, and
   wherein an outer diameter of the hole portion is greater than that of the fixed portion.

6. The device according to claim 1, further comprising:
   a flange member which is fixed to the drive unit; and
   a holder which holds the detector,
   wherein the flange member has a first hole portion,
   wherein the holder has a second hole portion,
   wherein an outer diameter of the first hole portion is greater than that of the fixed portion, and
   wherein an outer diameter of the second hole portion is greater than that of the fixed portion.

7. A lens barrel comprising:
   a drive unit comprising a lead screw;
   a rotation member that is fixed on the lead screw; and
   a detector that detects a rotation of the rotation member,
   wherein the lead screw is projected from a body portion of the drive unit,
   wherein the lead screw comprises a screw portion and a fixed portion on which the rotation member is fixed,
   wherein the rotation member is fixed on an outer periphery of the fixed portion,
   wherein the fixed portion is provided between the screw portion and the body portion of the drive unit,
   wherein the rotation member comprises (a) a detected portion that is detected by the detector and (b) a wall portion that extends from the detected portion along an axis of the lead screw and that surrounds a part of the lead screw.

8. The lens barrel according to claim 7, wherein the lead screw comprises a straight portion which is provided between the screw portion and the fixed portion, and
   wherein the wall portion surrounds the straight portion.

9. The lens barrel according to claim 7, the wall portion surrounds at least a part of the screw portion.

10. The lens barrel according to claim 7, further comprising:
    a flange member that is fixed to the drive unit,
    wherein the flange member has a hole portion, and
    wherein an outer diameter of the hole portion is greater than that of the fixed portion.

11. The lens barrel according to claim 7, further comprising:
    a holder which holds the detector,
    wherein the holder has a hole portion, and
    wherein an outer diameter of the hole portion is greater than that of the fixed portion.

12. The lens barrel according to claim 7, further comprising:
    a flange member which is fixed to the drive unit; and
    a holder which holds the detector,
    wherein the flange member has a first hole portion,
    wherein the holder has a second hole portion,
    wherein an outer diameter of the first hole portion is greater than that of the fixed portion, and
    wherein an outer diameter of the second hole portion is greater than that of the fixed portion.

13. An imaging apparatus comprising:
    a drive unit comprising a lead screw;
    a rotation member that is fixed on the lead screw; and
    a detector that detects a rotation of the rotation member,
    wherein the lead screw is projected from a body portion of the drive unit,
    wherein the lead screw comprises a screw portion and a fixed portion on which the rotation member is fixed,
    wherein the rotation member is fixed on an outer periphery of the fixed portion,
    wherein the fixed portion is provided between the screw portion and the body portion of the drive unit,
    wherein the rotation member comprises (a) a detected portion that is detected by the detector and (b) a wall portion that extends from the detected portion along an axis of the lead screw and that surrounds a part of the lead screw.

14. The imaging apparatus according to claim 13, wherein the lead screw comprises a straight portion which is provided between the screw portion and the fixed portion, and
    wherein the wall portion surrounds the straight portion.

15. The imaging apparatus according to claim 13, wherein the wall portion surrounds at least a part of the screw portion.

16. The imaging apparatus according to claim 13, further comprising:
    a flange member which is fixed to the drive unit,
    wherein the flange member has a hole portion, and
    wherein an outer diameter of the hole portion is greater than that of the fixed portion.

17. The imaging apparatus according to claim 13, further comprising:
    a holder which holds the detector,
    wherein the holder has a hole portion, and
    wherein an outer diameter of the hole portion is greater than that of the fixed portion.

18. The imaging apparatus according to claim 13, further comprising:
    a flange member which is fixed to the drive unit; and
    a holder which holds the detector,
    wherein the flange member has a first hole portion,
    wherein the holder has a second hole portion,
    wherein an outer diameter of the first hole portion is greater than that of the fixed portion, and
    wherein an outer diameter of the second hole portion is greater than that of the fixed portion.

* * * * *